United States Patent [19]

Matoba et al.

[11] Patent Number: 4,831,548
[45] Date of Patent: May 16, 1989

[54] TEACHING APPARATUS FOR ROBOT

[75] Inventors: Hideaki Matoba; Shunji Mohri; Masaru Ishikawa, all of Yokohama, Japan

[73] Assignee: Hitachi, Ltd., Tokyo, Japan

[21] Appl. No.: 922,454

[22] Filed: Oct. 23, 1986

[30] Foreign Application Priority Data

Oct. 23, 1985 [JP] Japan .................. 60-235201

[51] Int. Cl.⁴ .................. G05B 19/42; B25J 17/00
[52] U.S. Cl. .................. 364/513; 364/188; 364/522; 901/5; 901/47
[58] Field of Search .................. 364/513, 191-193, 364/188, 189, 171, 521, 522, 474.22; 901/47, 5; 340/724, 727, 729

[56] References Cited

U.S. PATENT DOCUMENTS

| | | | |
|---|---|---|---|
| 3,621,214 | 11/1971 | Romney et al. | 364/522 |
| 4,152,766 | 5/1979 | Osofsky et al. | 364/522 |
| 4,549,275 | 10/1985 | Sukonick | 340/729 |
| 4,594,673 | 6/1986 | Holly | 364/522 |
| 4,609,917 | 9/1986 | Shen | 340/729 |
| 4,618,991 | 10/1986 | Tabata et al. | 340/727 |
| 4,639,878 | 1/1987 | Day et al. | 364/513 |
| 4,667,236 | 5/1987 | Dresdner | 340/729 |
| 4,734,690 | 3/1988 | Waller | 364/521 |

FOREIGN PATENT DOCUMENTS 59-41012 3/1984 Japan .
59-60507 4/1984 Japan .

OTHER PUBLICATIONS

"Graphic Simulation for Off-Line Robot Programming," Phil Howie Robotics Today, pp. 63-66.
"Robot Task Planning: Programming Using Interactive Computer Graphics", proceedings of the 13th International Symposium on Industrial Robots and Robots 7, Apr. 17-21, 1983, pp. 7-122-7-135.

Primary Examiner—Allen MacDonald
Attorney, Agent, or Firm—Fay, Sharpe, Beall, Fagan, Minnich & McKee

[57] ABSTRACT

Disclosed is a teaching apparatus for a robot comprising a graphic display capable of displaying characters, symbols, and figures, a pointing device capable of indicating any point on the display screen, a storage for storing character, symbol, and graphic information, and an arithmetic and logic unit for taking in three dimensional data and data of hand coordinates system stored in the storage, calculating a conversion matrix $t_v$ for conversion to data of hand coordinates system and a conversion matrix $T_p$ for projection to the hand coordinates system, converting three dimensional data to two dimensional data according to the thus calculated conversion matrices $T_v$ and $T_p$, and allowing a display of surroundings viewed from a view point of the robot in motion or at rest to be made on the graphic display.

4 Claims, 8 Drawing Sheets

FIG. 5(a)

GRAPHIC DATA

| NO | SEGMENT CLASSIFICATION | FIGURE CLASSIFICATION | TWO DIMENSIONAL DATA (DATA TO BE DISPLAYED ON A SCREEN) | THREE DIMENSIONAL DATA (CUBIC FIGURE DATA) |
|---|---|---|---|---|
| 0 | PART | CYLINDER | | |
| 1 | ROBOT | RECTANGULAR PARALLELEPIPED | | |
| 2 | MENU | | | |
| ⋮ | | | | |

FIG. 5(b)

DATA OF HAND COORDINATES SYSTEM

| CENTER COORDINATES |
|---|
| VECTOR IN x-AXIS DIRECTION |
| VECTOR IN y-AXIS DIRECTION |
| VECTOR IN z-AXIS DIRECTION |

TEACHING APPARATUS FOR ROBOT

BACKGROUND OF THE INVENTION

The present invention relates to a teaching apparatus for a robot and particularly to an apparatus simplified in the teaching of operation of a robot by the use of a display on a screen with the robot hand taken as the reference point.

As the methods for teaching a robot, those described in Japanese Patent Laid-open Nos. 59-41012 and 59-60507, etc. have so far been known. And, in a system for teaching a robot by means of graphics, such a method is employed that a view point for a display on the screen is determined by numerical input for a direction vector for the view point, and the view point is thereby changed. An example thereof is shown in a paper entitled, "Robot Task Planning: Programming Using Interactive Computer Graphics", Proceedings of the 13th International Symposium on Industrial Robots and Robots 7, Apr. 17-21, 1983, at pages 7-122-7-135.

However, if it is attempted to teach a robot a part inserting operation, for example, by changing the view point according to such a method, it is not an easy task because of the following two reasons:

(1) Numerical information about the direction vector of the view point wherefrom the part inserting work is easily viewed must always be provided.

(2) After the view point for the display has been changed so that the object for the insertion may be easily viewed, the robot is moved so as to come in alignment with the object and then the inserting operation is taught to the robot. Thus, two steps of operation must be performed.

SUMMARY OF THE INVENTION

A principal object of the present invention is the provision of an apparatus for teaching a robot which, in teaching a robot by the use of graphics, will provide a display of surroundings viewed from the view point fixed to the robot hand in motion and will thereby simplify the teaching of the robot operation.

Summary of the invention will be given below referring to the accompanying drawings. FIG. 1 is showing an example of inserting a part, in which the part is to be inserted obliquely. In making the teaching in such a case, the following steps had to be taken in the prior art method:

(1) In order that the direction of the picture displayed on the screen is brought parallel to the inserting direction, the picture itself is rotated (through the following steps (i) and (ii)).

(i) The picture is turned so as to come in the direction from which the surface of insertion can be viewed (as illustrated in FIG. 8 (b)).

(ii) The picture is turned so as to come in the direction parallel to the inserting direction (as illustrated in FIG. 8 (c)).

(2) The arm of the robot is moved so that the part held thereby may be brought into position/orientation for insertion.

In the prior art method, as apparent from the above, operations had to be performed for rotation/travel of the part as the object for insertion as well as rotation/travel of the other part held by the robot hand. With the aim to simplify the above described steps of procedure, a display on the screen as viewed from the robot hand is contemplated in the present invention. And, it has been arranged so that the surroundings as viewed from the robot hand may be displayed on the screen, and, whenever the robot hand changes its orientation (namely, the axes of the robot are moved), the display of the surroundings may be changed always to provide the view as seen from the robot hand, and thereby, it may become possible for both the steps (1) and (2) above to be carried out at the same time.

BRIEF DESCRIPTION OF THE DRAWINGS

FIGS. 5(a) and 5(b) are drawings showing contents of graphic data and contents of data of hand coordinates system;

DETAILED DESCRIPTION OF THE PREFERRED EMBODIMENT

The present invention will be described below according to an embodiment shown in the accompanying drawings.

Figure 2:
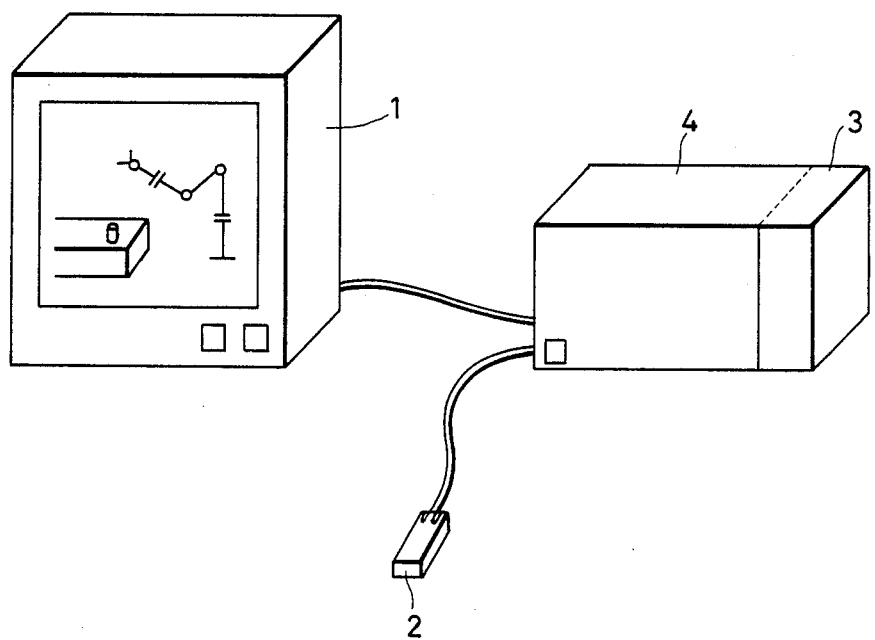
FIG. 2 is a drawing showing an arrangement of the teaching system according to the present invention.

FIG. 2 shows an arrangement of the teaching system, wherein reference numeral 1 denotes a graphic display for displaying figures, characters, symbols, etc., 2 denotes a mouse for indicating a point on the display screen, 3 denotes a graphic information storage, and 4 denotes an arithmetic and logic unit.

Figure 1:
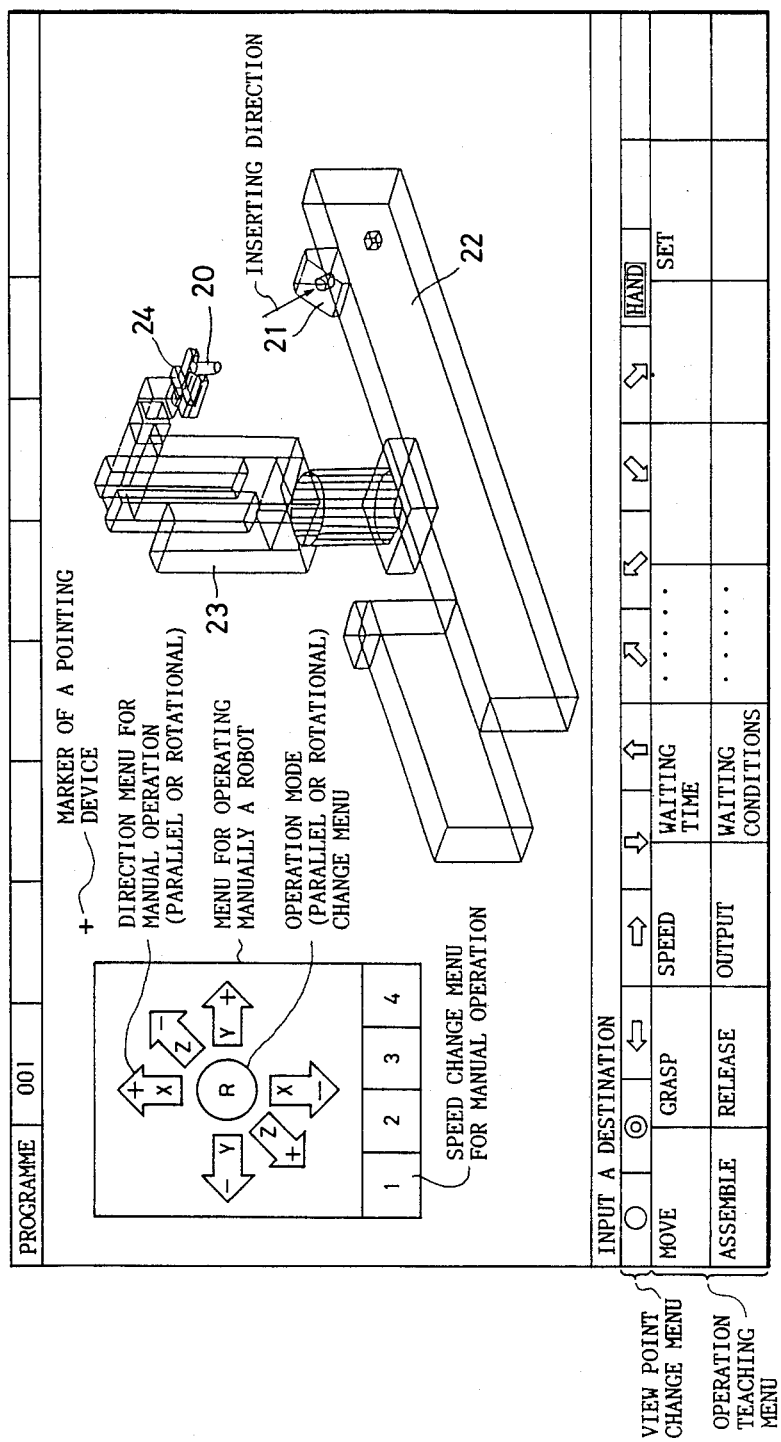
FIG. 1 is a drawing showing an example of the display on the screen according to the present invention.

FIG. 1 is an example of the display on the screen, in which a robot 23 provided a hand 24, parts 20, 21, various menus, etc. are displayed.

The menu for operating manually is that for effecting parallel/rotation movement of the robot in the specified direction by picking one of the arrows.

The view point change menu is that, in displaying the robot and the whole of the surroundings on the screen, for selecting the direction from which the displayed picture is viewed. (Examples: ⬒ viewed from above, ◎ viewed from the front) ⬇

The operation teaching menu is that for instructing inputs of various operations or positions of the robot.

Figure 3A:
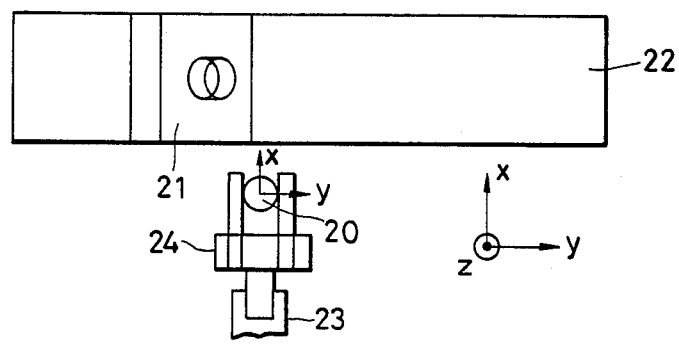
FIGS. 3(a)-3(c) are drawings showing an example of part inserting operation according to the present invention.
Figure 3B:
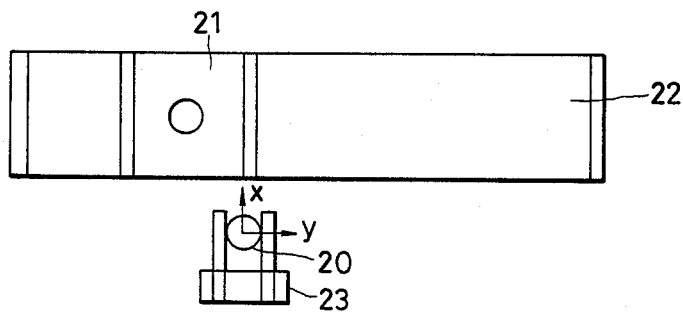
Figure 3C:
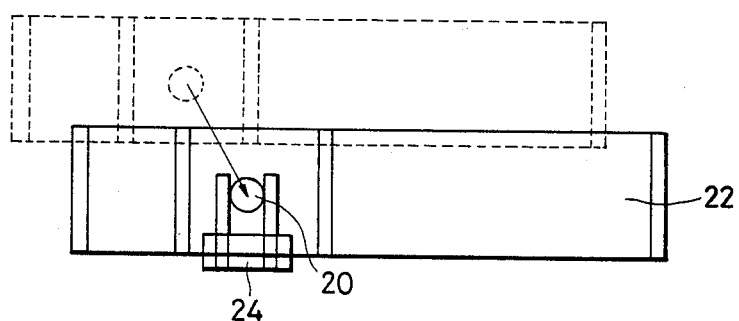

FIG. 3 shows transformations of the display on the screen when the teaching is made according to the method of the present invention taking as an example the case of inserting a part 20 into another part 21 as shown in FIG. 1 (with the portion of the inserting work is enlarged).

Figure 4:
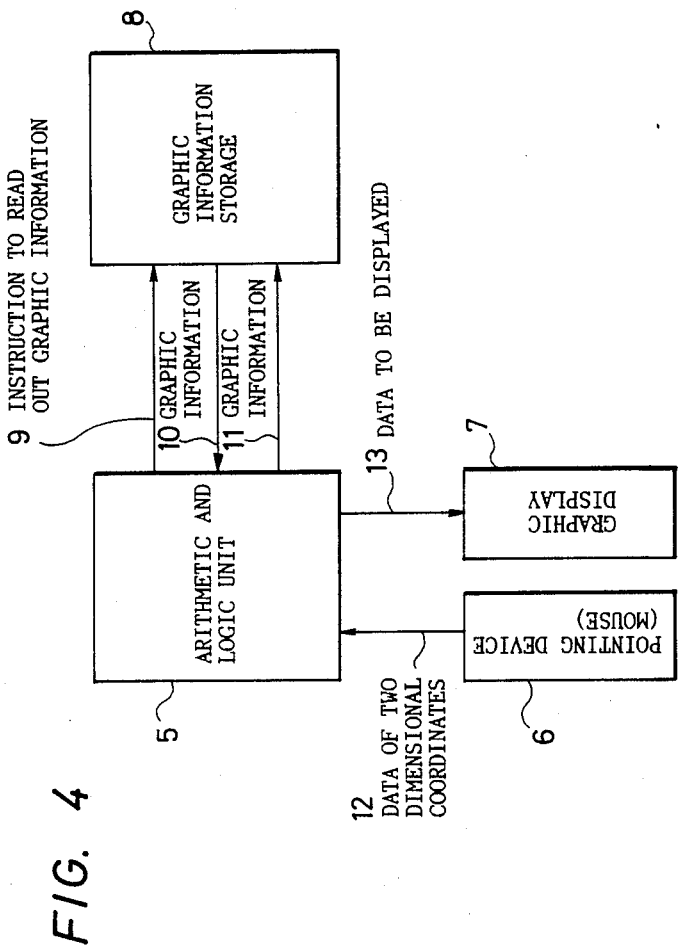
FIG. 4 is a block diagram showing processing in an embodiment of the present invention.

FIG. 4 is a block diagram showing an information flow between the components, in which 5 denotes an arithmetic and logic unit, 6 denotes a pointing device, 7 denotes a graphic display, 8 denotes a storage, 9 denotes an instruction to read out graphic information, 10 denotes graphic information, 11 denotes graphic information to be stored in the storage 9, 12 denotes two dimensional data of a picked point on the screen, and 13 denotes data to be displayed.

FIG. 5 shows contents of graphic information, that is, graphic data (geometric data) and data of hand coordinates system.

Using the example as shown in FIG. 3, the steps of procedure of the present invention will be described below. (Refer to FIGS. 1 to 5.)

First, the method to display a figure defined in three dimensional world coordinates (three dimensional coordinates possessed by the graphic display) in a two dimensional figure on the screen of the graphic display will be described.

In order to produce the two dimensional figure on the screen from the figure defined in the three dimensional world coordinates system, it is necessary to define a plane of projection in a suitable position in the three dimensional world space as well as to specify the direction of projection and kind of projection. This art is described in the book by David F. Rogers and J. Alan Adams, entitled "MATHEMATICAL ELEMENTS FOR COMPUTER GRAPHICS", translated by Fujio Yamaguchi, and published by Nikkan Kogyo Shimbunsha on July 25, 1980, or the book by F. R. A. Hopgood, D. A. Duce, J. R. Gallop, and D. C. Sutcliffe, entitled "INTRODUCTION TO GRAPHICAL KERNEL SYSTEM (GKS)", translated under supervision of Hiroyuki Yoshikawa, and published by Keigaku Shuppan on Jan. 31, 1986.

In the first embodiment (the display according to which is shown in FIG. 1), the plane, direction, and kind of projection are defined as follows:

plane of projection: x-y plane in the hand coordinates system because a center line of a part 20 coincides with a z-axis of the hand coordinates;

direction of projection: in the direction of z-axis in the hand coordinates system (with the view point in the origin of the hand coordinates); and kind of projection: parallel projection.

With the foregoing set up, a two dimensional figure on the screen is produced from a three dimensional world figure through the following two steps of procedure:

(i) Data described in the world coordinates system are converted into data in the hand coordinates system. (The conversion matrix used herein is expressed by $T_v$.)

(ii) The figure represented by the data obtained in (i) is subjected to a parallel projection onto an x-y plane in the hand coordinates system and the projected figure is made into the two dimensional figure on the screen. (The conversion matrix used herein is expressed by $T_p$.)

That is, the relationship between a point $[x_w, y_w, z_w]$ in the three dimensional world coordinates system and its projected point $[x_e, y_e, z_e]$ onto x-y plane in the hand coordinates system is given by $$[x_w, y_w, z_w] \cdot T_v \cdot T_p = [x_e, y_e, z_e] \quad (1)$$

where $[x_w, y_w, z_w]$ correspond to the three dimensional data and $[x_e, y_e, z_e]$ correspond to the two dimensional data.

FIG. 3 (a) indicates the figure viewed from $-z$ direction in the robot hand coordinates. The steps of procedure of transformation from the state (a) to the state (b) (in which the axial direction of the part to be inserted is brought parallel to the inserting direction) caused by rotation of the robot hand, and that therefrom to the final state (c) (in which the position and direction of the part to be inserted are brought in agreement with the inserting position and direction) will be described below.

(1) Instruction to rotate the hand around x-axis in + direction is given so that the direction of the part to be inserted may be brought parallel to the inserting direction. To effect the instruction to rotate, the arrow indicating x+ in the menu for operating manually as shown in FIG. 1 is picked with the pointing device 6 (namely, the marker of the pointing device is shifted to the location of the arrow and the button on the pointing device is depressed).

(2) The two dimensional coordinates data 12 on the screen input from the pointing device 6 are taken in by the arithmetic and logic unit 5.

(3) The arithmetic and logic unit 5 searches the two dimensional data in the storage 8 and identifies what figure (or character or symbol) on the screen was indicated (information 9, 10 is used).

This process is performed by calculating the distance between the two dimensional data in the storage 8 and the two dimensional coordinates data input from the pointing device 6.

Thus, the arrow indicating x+ is identified to have been input.

(4) The arithmetic and logic unit 5 reads the three dimensional data whose segment classification includes the surroundings and the part, and simultaneously reads the data of the hand coordinates system. (Information 9, 10 is used.)

(5) According to the rotation of the hand coordinates system (since the hand rotates), the arithmetic and logic unit 5 renews the data of the hand coordinates system (the direction vector of the axis) input in the step (4).

(6) The arithmetic and logic unit 5 renews the conversion matrices $T_v$ and $T_p$ according to the data of the hand coordinates system renewed in the step (5).

(7) The arithmetic and logic unit 5 calculates the two dimensional data (data to be displayed on the screen) according to equation (1) from the three dimensional data input in the step (4) and the conversion matrices obtained in the step (6).

(8) The arithmetic and logic unit 5 stores the data of the hand coordinates system and the two dimensional data obtained in the steps (5) and (7) in the storage 8. (Information 11 is used.)

(9) The arithmetic and logic unit 5 sends the two dimensional data obtained in the step (7) to the graphic display 7 as the display data 13. (The state as shown in FIG. 3 (b) is displayed.)

(10) Instruction for effecting parallel movement of the hand is given so that the part to be inserted may be brought into alignment with the insertion hole. For giving this instruction for the parallel movement, the menu for operating manually shown in FIG. 1 is used. The menu for operating manually shown in FIG. 1 is that for rotational movement as seen from the indication "R" made thereon, but, by taking the following steps, the same can be used as the menu for parallel movement (in parallel with each axis of the hand coordinates system):

(i) The menu "R" is picked.

(ii) The arithmetic and logic unit 5 identifies the menu "R" to have been picked through the steps similar to the steps (2) and (3).

(iii) The arithmetic and logic unit 5 takes the picking of the menu "R" as a request for changing the movement mode and reads the two dimensional data for the menu "P" (meaning parallel movement) registered in the graphic data in the storage, and outputs the same to the graphic display 7 after erasing the menu "R" on the graphic display. (Information 9, 10, 13 is used.) Thus "P" and "R" are alternately displayed by picking "R" or "P".

Thereafter, when an arrow in the menu for operating manually in FIG. 1 is picked, it is taken as the request for parallel movement in the direction indicated by the picked arrow.

(11) The procedures after the entry of the menu for operating manually are the same as those in the steps (4)-(9), where, however, the coordinates of the center of the hand are renewed in the step (5) corresponding to the parallel movement.

Figure 6:
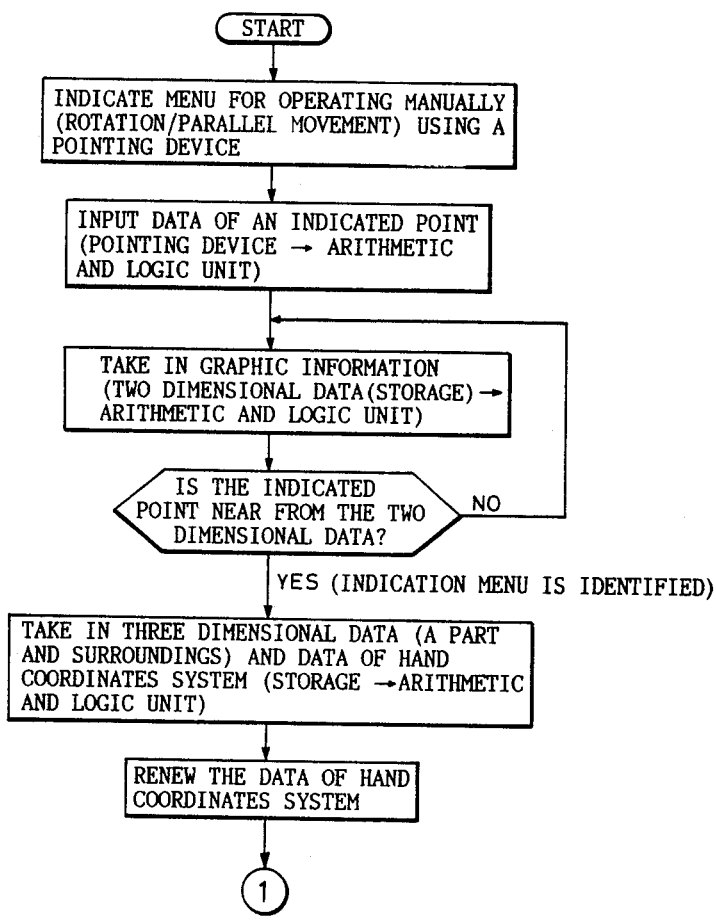
FIGS. 6 and 7 are flowcharts showing steps of procedure according to the present invention.
Figure 7:
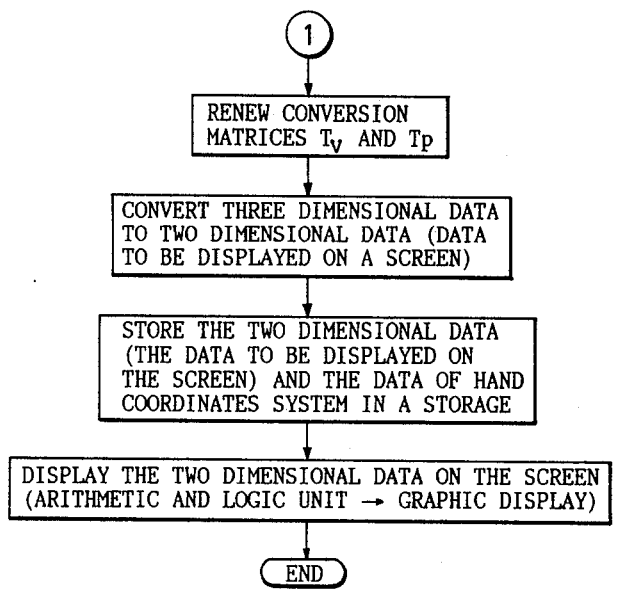
Figure 8A:
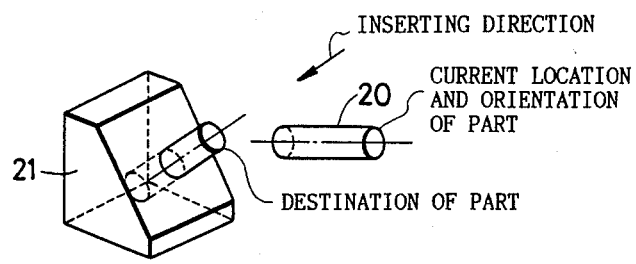
FIGS. 8(a)-8(c) are drawings for explaining problems in the prior art.
Figure 8B:
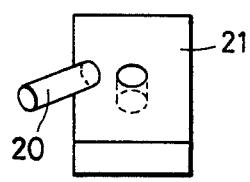
Figure 8C:
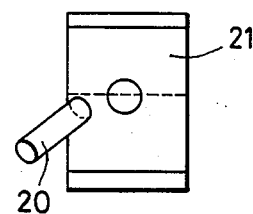

The above steps of procedure are shown in the flow-charts of FIGS. 6 and 7.

Incidentally, parallel projection has been used as the kind of projection in the above described embodiment, the case where perspective projection is used can also be processed through like steps of procedure with only the conversion matrix $T_p$ and the view point changed.

After the manual operation has been finished according to the above described steps of procedure, if it is desired to teach the present position, the "Set" menu in FIG. 1 may be picked. Then, the data of the hand coordinates system at that point (FIG. 5 (b)) are stored in the storage 8 as the present position.

Although, in the above described embodiment, the mouse has been used as the pointing device, it can be substituted by a joystick, tablet, trackball, etc. which can input coordinates of any point on the screen.

And, although, in the above described embodiment, the view point has been set up in the center of the hand, it is also possible to set it up in any position/orientation of the robot arm or on a material transported on a conveyer. (Only the data of the hand coordinates system are required to be changed.)

While the case where the present invention is used for teaching of operation has been shown in the above described embodiment, it can also be applied to the display on the screen viewed from a dynamic view point at the time of simulation of robot operation.

According to the present invention as described so far, the teaching of the target of operation to the robot has become attainable only by rotation/parallel movement of the robot hand, and therefore, a result of achieving reduction in the man-hour for the teaching task is obtained.

What is claimed is:

1. A teaching apparatus for a robot hand functioning in surroundings, comprising: a graphic display capable of displaying characters, symbols, and figures, a pointing device capable of indicating any point on the graphic display, a storage for storing characters, symbols, and graphic information, and an arithmetic and logic unit for taking in three dimensional data of a world coordinates system and data of a robot hand coordinates system stored in said storage;

said arithmetic and logic unit further having means for calculating a conversion matrix $T_v$ for converting three dimensional data of the world coordinates system to data of the robot hand coordinates system and a conversion matrix $T_p$ for converting the three dimensional data of the robot hand coordinates system to a two dimensional projection in the robot hand coordinates system, said arithmetic and logic unit converting the three dimensional data of the world coordinates systems to two dimensional projection data of the robot hand coordinates system by applying the thus calculated conversion matrices $T_v$ and $T_p$ to produce output data;

said arithmetic and logic unit further having means for reading the data of the robot hand coordinates system after movement of the robot hand to obtain renewed robot hand coordinates system data, said means for calculating further for calculating renewed conversion matrices $T_v$ and $T_p$ according to the renewed robot hand coordinates system data; said arithmetic and logic unit further converting the three dimensional data of the world coordinates system to two dimensional projection data of the robot hand coordinates system by applying the renewed conversion matrices to produce renewed output data; and said graphic display receiving said output data and having means for providing a display of the surroundings viewed from a view point of the robot hand and further receiving said renewed output data after movement of the robot hand for changing the display and providing a display of the surroundings viewed from a viewpoint of the robot hand in motion.

2. A teaching apparatus for a robot according to claim 1, wherein said graphic display has menu display means for displaying selective instructions and said arithmetic and logic unit further has means for receiving from said pointing device a section from said menu display means for instructing the direction for operating the robot hand manually and for instructing a method of movement wherein said method of movement is one of parallel movement and rotational movement.

3. A teaching apparatus for a robot according to claim 2, wherein said arithmetic and logic unit further has means for erasing a display of the surroundings viewed from the view point of the robot hand coordinates and for providing an output to be received by said graphic display for providing a display of the surroundings viewed from an arbitrary direction in the world coordinates system to be displayed in response to a selection made with said pointing device from said menu display means.

4. A teaching apparatus for a robot according to claim 1, wherein said graphic display has menu display means for displaying selective display instructions and said arithmetic and logic unit further has means for receiving from said pointing device a selection from said menu display means to provide a display of the surroundings viewed from the view point of the robot hand coordinates.

* * * * *